Figure 1:
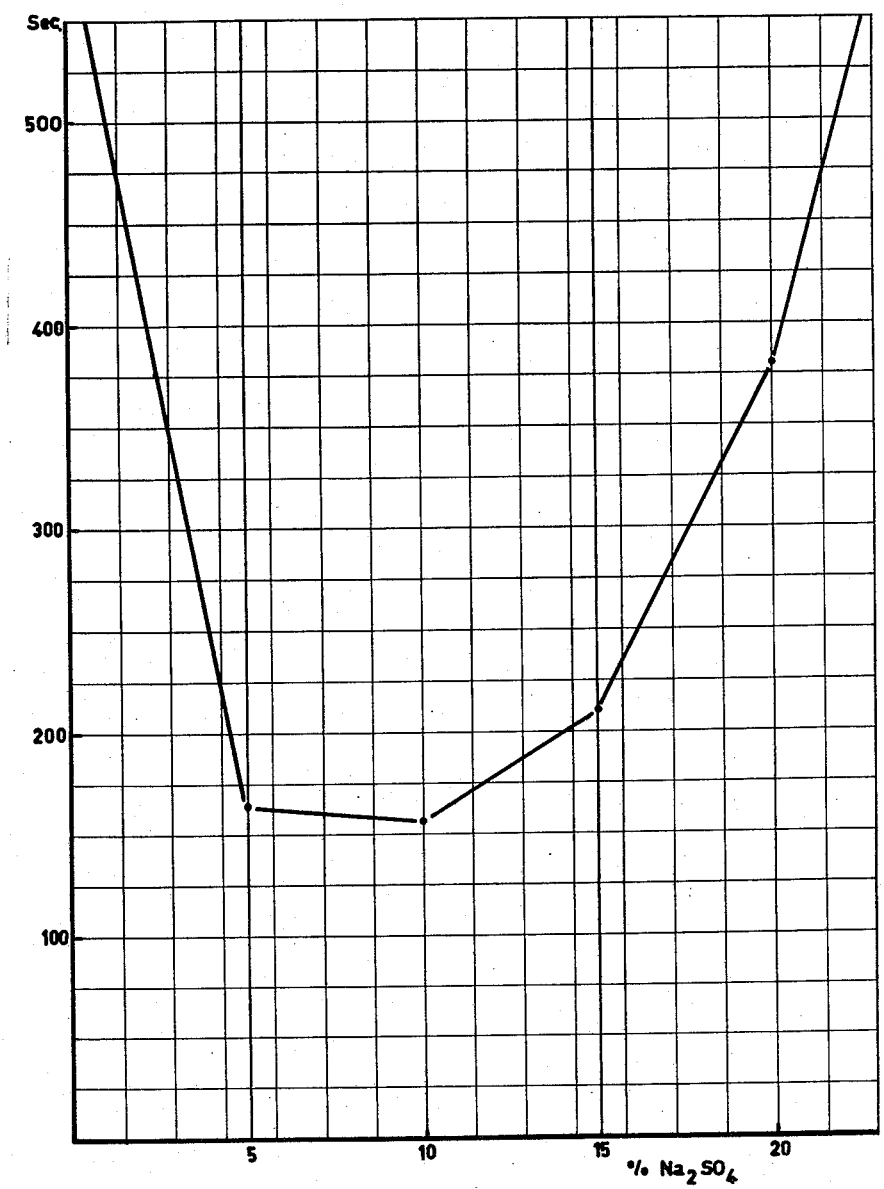

INVENTOR.
GEERT MOES

United States Patent Office 3,097,102
Patented July 9, 1963

3,097,102
COLD WATER DISPERSIBLE STARCH AND
METHOD OF PREPARATION
Geert Moes, Hoogezand, Netherlands, assignor to W. A. Scholten's Chemische Fabrieken N.V., Groningen, Netherlands, a corporation of the Netherlands
Filed July 18, 1960, Ser. No. 43,605
Claims priority, application Netherlands July 24, 1959
10 Claims. (Cl. 106—210)

The invention relates to a cold water dispersible starch and to a method of preparing same. This method comprises subjecting a mixture of starch and water in the presence of 2–6% of borax and 5–15% of anhydrous sodium sulphate, potassium sulphate or magnesium sulphate, based on the weight of the starch, to a heating process with instantaneous removal of water, following which the resultant dry product is reduced to such a particle size that at least 50 percent is finer than 100 mesh.

By the term starch we means amylaceous substances such as untreated starch as well as modified starches and starch derivatives including oxidized, hydrolized, etherified and esterified starches still retaining amylaceous material. The starches may be derived from any source, including corn, wheat, grain, sorghum, rice, waxy maize, sago, potato or tapioca. To enhance the dispersibility characteristics of the finished products, especially when non-glutinous cereal starches are used, a modification or derivatization of the starch is desirable.

By borax is meant the sodium tetraborate decahydrate ($Na_2B_4O_7.10H_2O$). Instead of the decahydrate we may also use the equivalent amount of anhydrous sodium tetraborate ($Na_2B_4O_7$), but commercial borax is preferred.

The heating process should be rapid and should permit free evaporation of water. The heat treatment may be affected on heated rolls or in a spray drier. Either a starch slurry or a paste containing the borax and sulphate may be roll or spray dried. When a starch slurry is subjected to the heating process, sufficient water should be present to provide for gelatinization during the heat treatment. When drying the mixture on heated rolls in conventional manner, the rolls are stream heated to temperatures varying from about 100° C. to about 180° C. In the spray drier the inlet air temperature is usually higher, such as up to 220° C. Starch temperatures in this type of dryer will also vary from about 100° C. to about 180° C.

The material coming from the rolls is so finely ground that at least 50%, and preferably a considerably higher percentage, of the ground product passes through sieve No. 100 of the American Society for Testing Materials. Surprisingly it has appeared that the very finely around starch products according to the invention, more than half of the particles of which have a diameter smaller than 149 micron, may be dispersed in cold water without any lump formation and will be completely colloidally dissolved within a few minutes.

The pH of the mixture which is fed to the drier should preferably be adjusted in such a way that the final dried product is slightly alkaline.

In accordance with a preferred embodiment of the invention 4% of borax and 10% of anhydrous sodium sulphate is added to the starch, whereby products are obtained which are distinguished in that they dissolve very rapidly in cold water and do not form lumps despite the fine grinding.

Extremely good results within the indicated limits as regards the solubility in cold water and the absence of lump formation are also obtained, however, with slightly lower or higher percentages of borax and/or sodium sulphate. Good results are also obtained with potassium sulphate and magnesium sulphate.

The products obtained according to the invention are outstanding as laundry starches and have many special advantages for this purpose over the conventional laundry starches used up to now. Notwithstanding the fact that the new products are in a finely ground condition, they nevertheless dissolve extremely quickly in cold water without forming lumps, so that they are exceedingly suitable for household use. Further advantages of the new products as laundry starches are that they do not stick to the iron during ironing, that the finished fabrics are easy to iron and that a beautiful hand is imparted to the starched fabrics.

These advantages are only reached if a combination of borax with one of the mentioned sulphates in the indicated amounts is applied. A product having the properties aimed at is not obtained with borax or one of the sulphates alone. Much less favourable results are also obtained when starch preparations are used containing both borax and one of the sulphates, but in proportions outside the range given in the foregoing.

The products according to the invention may be used as such or in combination with the usual additions for laundry starches, such as pine oil, waxes, paraffin, stearine or fat alcohol sulphates. These additions may be incorporated into the laundry starches according to the invention prior to or during the cold swelling starch process.

In adition to being used as laundry starch, the products according to the invention are also suitable for other applications, e.g. in the paper manufacture where it is likewise very advantageous to have a binding agent which dissolves extremely quickly without lump formation.

The invention will be further elucidated by the following examples.

Example I

Suspensions of potato starch in water are prepared to which the following amounts by weight of borax and anhydrous sodium sulphate are added.

| Test No. | Potato starch | Water | Borax, $Na_2B_4O_7.10H_2O$ | Sodium sulphate, anhydrous |
|---|---|---|---|---|
| 1 | 1,000 | 1,500 | 40 | 0 |
| 2 | 1,000 | 1,500 | 40 | 50 |
| 3 | 1,000 | 1,500 | 40 | 100 |
| 4 | 1,000 | 1,500 | 40 | 150 |
| 5 | 1,000 | 1,500 | 40 | 200 |
| 6 | 1,000 | 1,500 | 0 | 100 |
| 7 | 1,000 | 1,500 | 20 | 100 |
| 8 | 1,000 | 1,500 | 40 | 100 |
| 9 | 1,000 | 1,500 | 60 | 100 |
| 10 | 1,000 | 1,500 | 80 | 100 |
| 11 | 1,000 | 1,500 | 100 | 100 |

The suspensions are spread on a rotating drum heated to a temperature of 145–150° (about 4–5 at. steam pressure) by means of pressing rollers, the layers thus formed being heated and simultaneously dried. The heated roller makes 3–4 revolutions per minute. The dry products which are obtained in a layer thickness of about 0.1–0.2 mm. are ground through a screen with openings of 0.25 mm.

Sieve analyses show that more than half of the ground products pass through sieve No. 100 of the American Society for Testing Materials, so that at least 50% of the final products is finer than 100 mesh.

The dispersibility of the products according to the invention can be determined in a simple manner by means of a metal funnel specially constructed for this purpose. This funnel can hold 500 cc. of an aqueous liquid and is provided with a sieve of 70 mesh having a surface area of 1.75 cm.² For comparing the dispersibility fractions between 100 and 200 mesh of the various preparations are taken. 3 grams of each fraction are dispersed while being agitated in 300 cc. of water of 20° C. in a beaker of 600 cc. The dispersions are agitated at a constant rate for a period of five minutes and subsequently poured into the funnel, following which the time is measured, which 200 cc. of the solution requires for passing through the funnel. For the above products the following out flow times have been found.

| Test No. | Borax, Na₂B₄O₇.10H₂O Percent | Sodium sulphate, anhydrous Percent | Out flow time in sec. |
|---|---|---|---|
| 1 | 4 | 0 | cannot be measured. |
| 2 | 4 | 5 | 164. |
| 3 | 4 | 10 | 157. |
| 4 | 4 | 15 | 211. |
| 5 | 4 | 20 | 379. |
| 6 | 0 | 10 | cannot be measured. |
| 7 | 2 | 10 | 187. |
| 8 | 4 | 10 | 157. |
| 9 | 6 | 10 | 275. |
| 10 | 8 | 10 | cannot be measured. |
| 11 | 10 | 10 | Do. |

The values found for test 1 to 5 inclusive have been entered in FIGURE 1. It appears that with a sodium sulphate content of 5–15% the curve shows a clear minimum which points to an optimal dispersibility of these products.

Figure 2:
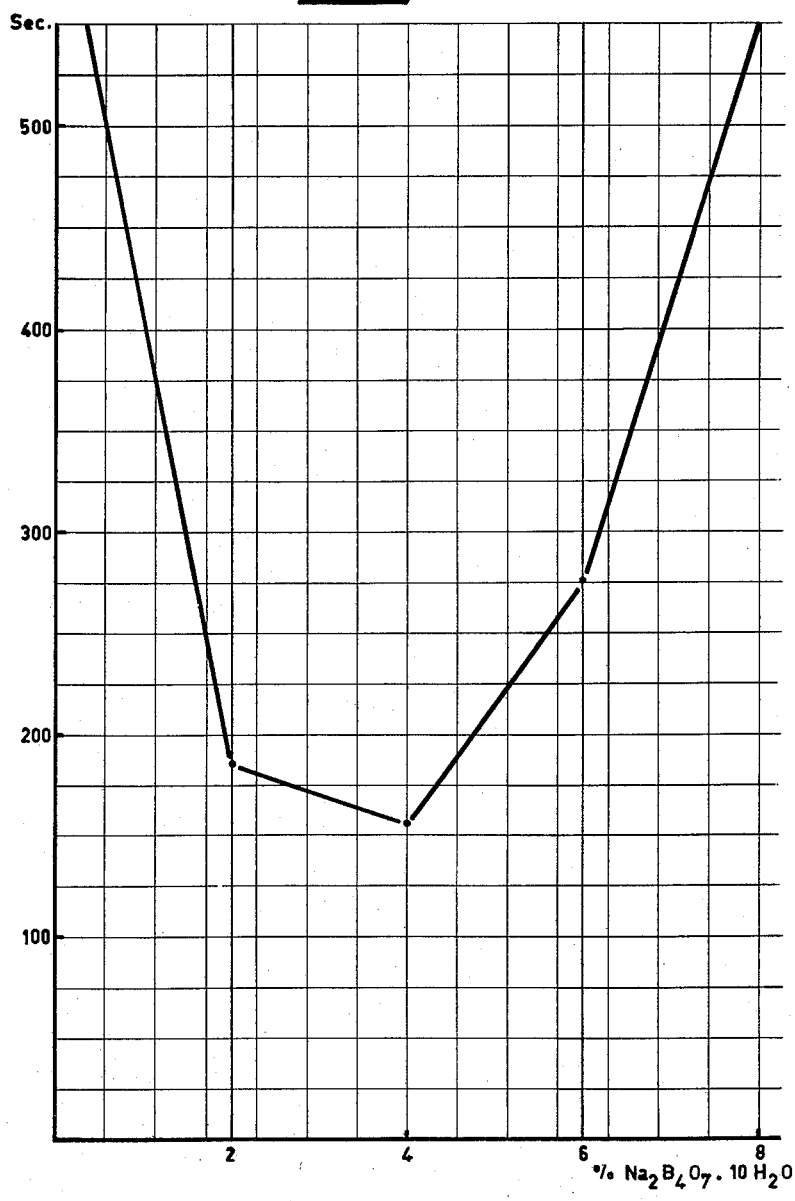

For the products having a varying borax content (tests 6 to 11 inclusive), on optimal dispersibility has been found with contents of 2–6% of borax, as appears from FIGURE 2.

The product obtained with 4% of borax and 10% of sodium sulphate is extremely suitable for being used as a cold water dispersible laundry starch; it is characterized by an excellent dispersibility and a high rate of solubility in cold water. If 20 grams of the ground product are suspended in 1000 cc. of water of room temperature, within a few minutes a completely uniform dispersion of the cold swelling starch particles is obtained, which particles are fully dissolved after standing only a short time. The dissolved starch preparation is taken up very uniformly by the laundry so that upon ironing or pressing a beautiful finish is obtained which is firm and full to the touch, with no covering of colours or depositing of starch occurring.

*Example II*

1000 parts by weight of a maize starch, slightly etherified with 1.2-epoxyethane and having a degree of substitution of 0.16 hydroxyethyl group per anhydroglucose unit, are suspended in 1800 parts by weight of water in which 30 parts by weight of borax and 120 parts by weight of anhydrous sodium sulphate have previously been dissolved. The suspension thus prepared is converted into cold water dispersible starch in the manner described in Example I, whereupon the material coming from the rolls is ground through a sieve (mesh 0.33 mm.). The distribution of the particle size of the ground final product, determined by means of ASTM sieves, is as follows:

Sieve fraction— Percentage
20–40 _____ 0
40–70 _____ 6
70–100 _____ 13
100–200 _____ 40
<200 _____ 41

The dispersibility of the resultant product, determined according to the method described in Example I, is 78 seconds after five minutes agitating.

Products having good dispersibility are also obtained if instead of an ether of maize starch having a low degree of substitution a corresponding ester of maize starch, e.g. a starch acetate, is used as a starting material.

*Example III*

1000 parts by weight of oxidized potato starch are suspended in 1500 parts by weight of water in which 40 parts by weight of borax and 200 parts by weight of magnesium sulphate ($MgSO_4.7H_2O$) have previously been dissolved. The suspension is spread in a thin layer on a rotating roll heated to a temperature of 150–160° C. and dried, whereupon the resultant thin film is finely ground. It appears from a sieve analysis that 87% of the final product has a particle size below 100 mesh. The final product dissolves extremely quickly in cold water without any objectionable lump formation; the dispersibility determined by the method described in Example I appears to be only 18 seconds after five minutes' agitation.

*Example IV*

1000 parts by weight of tapioca starch is thoroughly mixed with 1500 parts by weight of water and 200 parts by weight of a 30% potassium hydroxide solution. The resultant alkali starch paste is agitated for a quarter of an hour, after which the pH of the mass is adjusted to 7 by means of 10 N sulphuric acid. 40 parts by weight of borax are subsequently added and the mass is diluted with water to a starch concentration of about 10 percent. This paste is fed into a spray drier (Niro Atomizer) at an inlet air temperature of 220° C. and an outlet temperature of 120° C. The ground final products, 80% of which has a particle size below 100 mesh, is an excellent ready-for-use, quickly dissolving laundry starch. The dispersibility of the starch preparation, determined according to the method described in Example I, amounts to 14 seconds after an agitation time of 5 minutes.

I claim:
1. A method of producing a cold water dispersible starch comprising heating a mixture of starch and water in the presence of 2–6% of borax and 5–15% of an anhydrous sulfate selected from the group consisting of sodium sulfate, potassium sulfate and magnesium sulfate, based on the weight of the starch, to a temperature of from 100 to 180° C., removing the water vapor instantaneously to dry said mixture, and then reducing the resultant dry product to a particle size so that at least 50% is finer than 100 mesh.
2. A method according to claim 1, wherein 4% of borax and 10% of anhydrous sodium sulphate is used.
3. A method according to claim 1, wherein the starch used is potato starch.
4. A method according to claim 1, wherein the starch used is a tapioca starch.
5. A method according to claim 1, wherein the starch used is oxidized potato starch.
6. A method according to claim 1, wherein the starch used is etherified maize starch.
7. A method according to claim 1, wherein the starch used is esterified maize starch.
8. A cold water dispersible starch comprising a powder consisting of pregelatinized starch having incorporated therein borax in a quantity of from 2 to 6% based on the weight of the starch and an anhydrous sulphate selected from the group consisting of sodium sulphate, potassium sulphate and magnesium sulphate in a proportion of from 5 to 15%, based on the weight of the starch, said powder having such a particle size that at least 50 percent is finer than 100 mesh.
9. A method of producing a cold water dispersible starch comprising heating by the roller drying process a mixture of starch and water in the presence of 2–6% of borax and 5–15% of an anhydrous sulfate selected from the group consisting of sodium sulfate, potassium sulfate and magnesium sulfate, based on the weight of the starch, to a temperature of from 100 to 180° C., removing the water vapor instantaneously to dry said mixture, and then reducing the resultant dry product to a particle size so that at least 50 percent is finer than 100 mesh.
10. A method of producing a cold water dispersible starch comprising heating by the spray drying process a mixture of starch and water in the presence of 2–6% of borax and 5–15% of an anhydrous sulfate selected from the group consisting of sodium sulfate, potassium sulfate and magnesium sulfate, based on the weight of the starch, to a temperature of from 100 to 180° C., removing the water vapor instantaneously to dry said mixture, and then reducing the resultant dry product to a particle size so that at least 50 percent is finer than 100 mesh.

References Cited in the file of this patent
UNITED STATES PATENTS 2,819,980   McCombs et al. _____ Jan. 14, 1958
2,865,775   Todd _____ Dec. 23, 1958